(No Model.) 2 Sheets—Sheet 1.
G. N. DE LORIEA.
BONELESS HAM STUFFING MACHINE.
No. 454,112. Patented June 16, 1891.
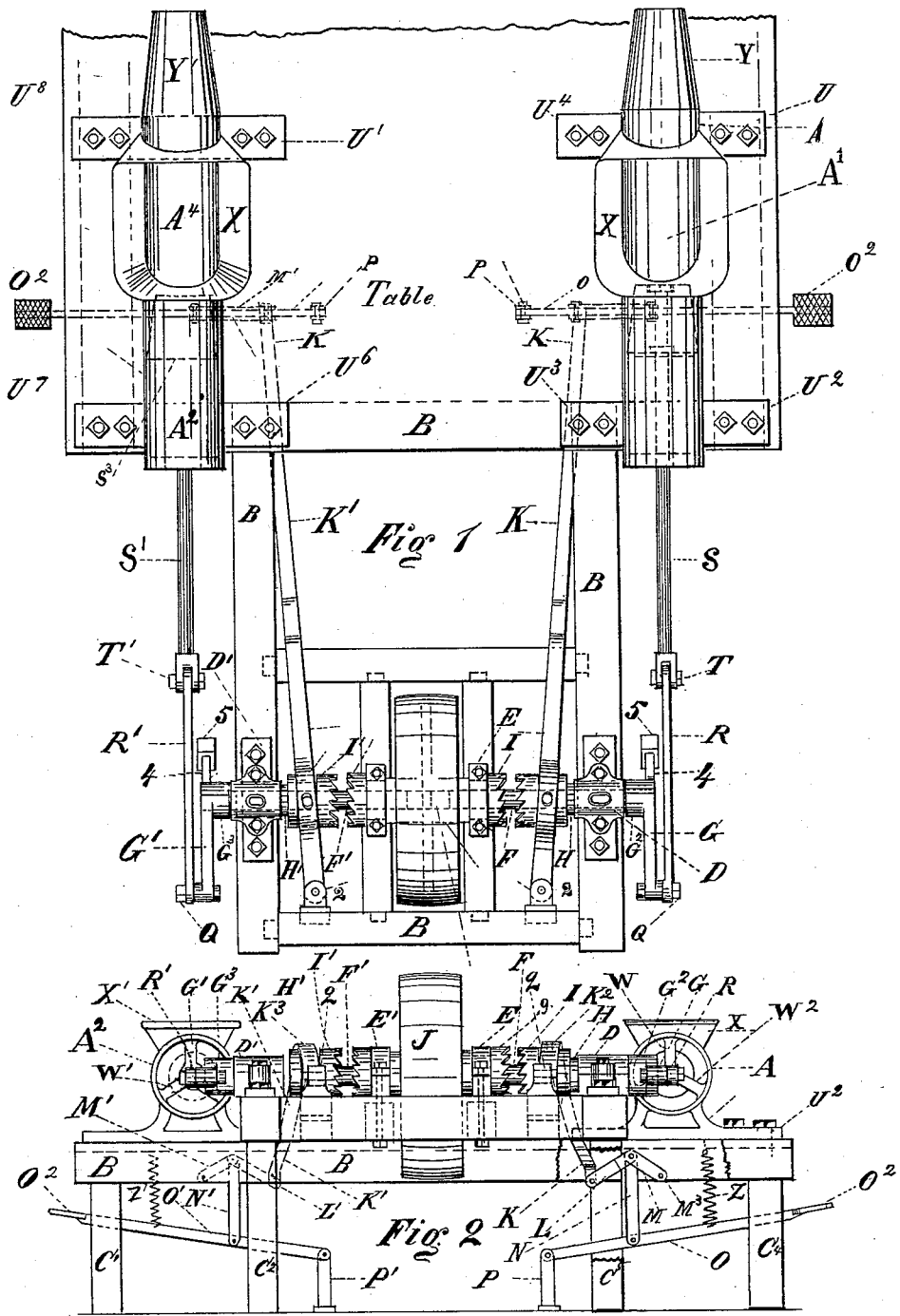
Witnesses:
Edw. Barrath
Frank J. Leonard
INVENTOR:
George N. DeLoriea (No Model.) 2 Sheets—Sheet 2.
G. N. DE LORIEA.
BONELESS HAM STUFFING MACHINE.
No. 454,112. Patented June 16, 1891.
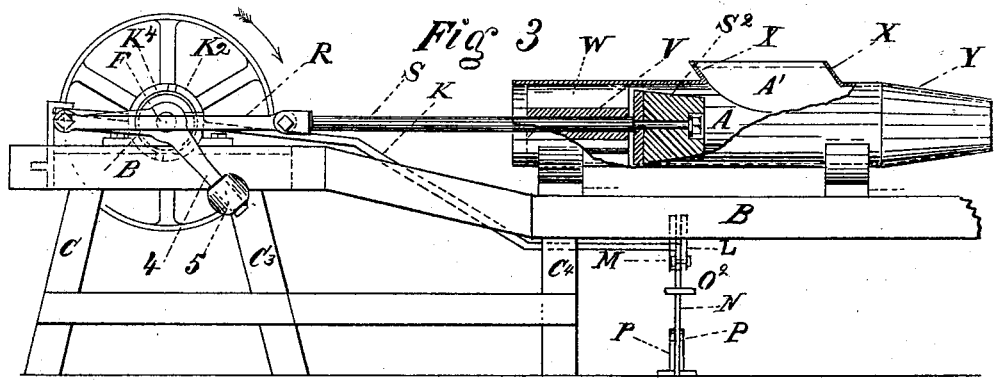
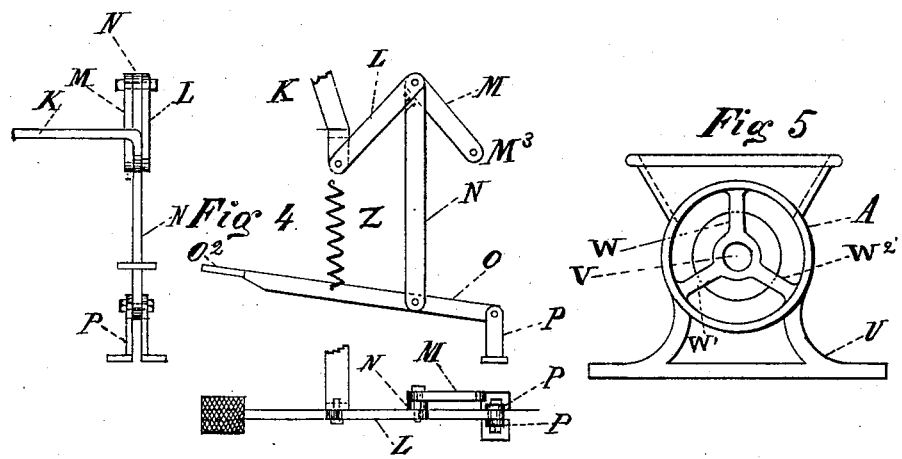
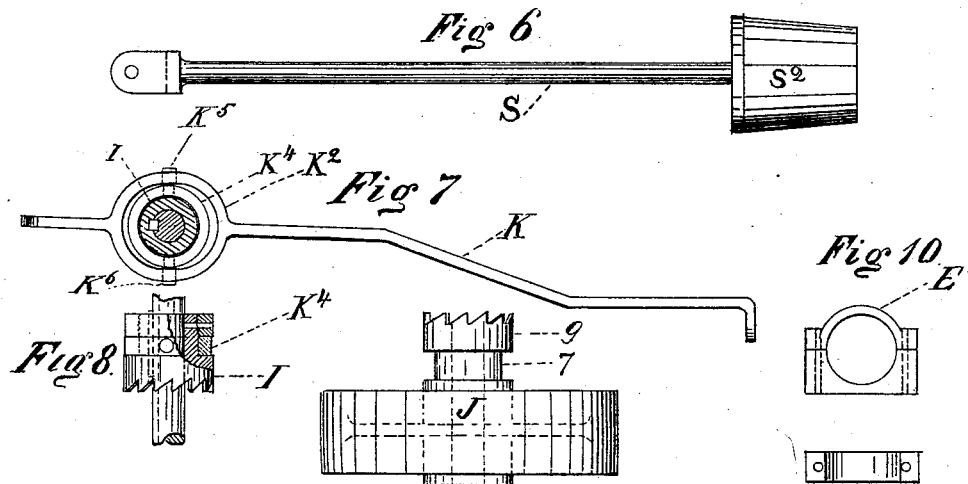
Witnesses:
Edw. Barrath
Frank J. Lenard
INVENTOR:
George N. De Loriea

UNITED STATES PATENT OFFICE.

GEORGE NATHANIEL DE LORIEA, OF CHICAGO, ILLINOIS.

BONELESS-HAM-STUFFING MACHINE.

SPECIFICATION forming part of Letters Patent No. 454,112, dated June 16, 1891.

Application filed January 23, 1891. Serial No. 378,749. (No model.)

*To all whom it may concern:*

Be it known that I, GEORGE NATHANIEL DE LORIEA, a citizen of the United States of America, residing at Chicago, in the county of Cook, State of Illinois, have invented a new and useful Improvement in Boneless-Ham-Stuffing Machines, of which the following is a complete description and specification.

My invention relates to an improvement in meat-stuffing machines, especially for stuffing what is termed "boneless ham" into a casing—an operation heretofore accomplished by hand. In the machine a reciprocating plunger or piston operates in conjunction with a cylinder with one end tapered into a nozzle, said cylinder having an opening on the side fitted with a hopper for receiving the stuffing material.

The object of my invention is, first, to provide a machine so constructed that the casing for the material to be stuffed can be placed on a nozzle whose shape admits the use of different sizes of casing; second, to provide for an opening on the side of the cylinder, so that the material of which the stuffing consists can be inserted; third, to provide for a reciprocating plunger or piston working in said cylinder, pushing the material to the foremost or nozzle end of the cylinder, forcing it into the nozzle and thence ejecting it into the casing, one end of which has been previously drawn over the nozzle; fourth, to provide a suitable mechanism for operating the said plunger or piston, so that after it works it will return and stop at the back end of cylinder, allowing new stuffing material to be inserted. I attain these objects through the following instrumentalities, shown on the accompanying drawings, on which letters of reference refer to corresponding similar letters used in the following specification.

Figure 1 represents a plan of a double machine; Fig. 2, an end view; Fig. 3, a side view with part of cylinder and hopper in section. Fig. 4 shows, enlarged, an end, side, and top view of parts of treadle mechanism; Fig. 5, an enlarged end view of cylinder, showing the arms cast in back end of cylinder holding the sleeve guiding the plunger or piston-rod; Fig. 6, an enlarged view of piston and piston-rod; Fig. 7, a lever for operating the clutch starting the machine. Fig. 8 shows the clutch; Fig. 9, a driving-pulley with clutch-hub cast thereto; Fig. 10, bearings for driving-pulley.

The frame B, with its supports C C' C$^2$ C$^3$ C$^4$ C$^5$, constitutes the frame-work of the machine. On the frame is mounted bearings D D' and E E' and stuffing-cylinders A A$^2$. In the bearings D D' turn the shafts F F'. On one end of each are fastened the cranks G G', secured to said shaft through the medium of hubs G$^2$ G$^3$, keyed or set-screwed thereto. Attached to the hubs are also balance-levers 4 4', supplied with weights 5 5'. On shafts F F' are turned collars H H', preventing a lateral motion of the shafts in the bearings D D'. Clutches I I' are fitted on the shafts F F' in such a manner as to allow a lateral motion. Being fitted with a spline on the shafts, Fig. 7, said clutches are operated by levers K K, which in their turn are operated through the medium of links L L' M M' N N' by the foot-treadle bars O O', supplied with stepping-plates O$^2$. The other end of the treadle-bar is fastened by a screw to a stationary stand P P', which upper end forms a fulcrum for the treadle-levers. Shafts F F' are driven by pulley J, whose hub is bored to receive the ends of the shafts F F', forming a bearing for the same. The hub of the driving-pulley J is extended on each side beyond its rim for the purpose of providing journals 7 and 8, Fig. 9. Pulley-journals are turned to a smaller diameter than the hub for the purpose of preventing a lateral motion of the pulley when resting in its bearings E E', Figs. 1, 2, and 9, and on each side of the hub teeth are cast in conformity with those on the clutches I I', and in such shape that when engaged a firm connection will be established. The pulley is always revolving loose in its bearings E E', being driven by a belt from a counter-shaft or directly from the main-line shafting. The cranks G G' are connected by the screws Q to one end of the connecting-rod R R', while the other end is embraced by lugs forged on the ends of plunger-rods S S and held in place by screws T T'. The stuffing-cylinders A A$^2$ are both exactly alike, (the description of one is the same for both,) and are mounted upon a table forming part of the frame-work B. These cylinders are hollow and are preferably cast in one piece and supplied with legs or lugs U' U$^2$ U$^3$ U$^4$ for fastening them to the table.

Different parts of the cylinder have different functions. One end is supplied with a sleeve or bearing for supporting and guiding the piston-rod S, Figs 3 and 5, said sleeve being cast and held in place by radiating-arms W W' W², leaving opening between for a purpose that will hereinafter be described. The middle part of cylinder is supplied with an opening A', fitted with a hopper X. This part of the cylinder serves to receive the stuffing material. The third part or front end of the cylinder is tapered into a preferably conical nozzle, for the purpose of drawing one end of the casing or gut to be stuffed over the same. The reasons assigned for its preferable conical shape are, first, the casing or gut is more easily attached; second, it permits the use of different sizes of casing as regards their diameter; third, it serves to compress the material, giving it a uniform diameter.

The treadle mechanism for each side of a double machine is exactly alike and operated independently of each other, and consists of treadle-bars O O', links L L' N N' M M', springs Z Z', and stands P P'.

The operation of the machine is as follows, (the operation of one side of the machine being identically the same as the other:) One end of a casing or gut to be stuffed is pushed over the nozzle Y of the cylinder, a piece of ham meat is inserted into the cylinder A through the hopper X and opening A'. The foot-treadle is depressed, communicating the motion through link N to links L and M. Link M will then swing on its stationary fulcrum M³. One end of link L is fastened to the operating-lever K, and as both links L and M are fastened by one end to the connecting-link N the downward motion of the treadle-bar produces a horizontal motion of the operating-lever K; and as lever K is forged or cast with an eye K², Fig. 7, encircling the clutch I and fastened to same through a swivel-ring K⁴, into which is screwed pins K⁵ K⁶, passing through eye K² of the operating-lever K, Figs. 7 and 8. The fulcrum end of lever K is fastened to stationary stand 2, fastened in the frame-work. The horizontal motion of the lever thus produced carries the clutch I in proximity and contact with the toothed hub of the revolving pulley J, Fig. 9, thereby starting the mechanism of the machine, transmitting motion to the shaft F, crank G, weight-lever 4, weight 5, connecting-rod R, and thence giving a reciprocating motion to the piston S² and piston-rod S, forcing the material inserted into the cylinder A into the nozzle Y, and thence ejecting it into the casing, one end of which has been previously drawn over the nozzle. At this moment the operator removes his foot from the treadle-bar O and the spring Z draws up the depressed treadle-bar, transmitting the motion through the link N to levers M and L, which in their turn change the motion into a horizontal motion of the operating-lever K, which withdraws the clutch I from contact with the pulley J. The motion of the piston S² is retarded by means of the weight 5, placed on the weight-lever 4 nearly opposite the crank. The gravity acting on the weight 5, placed on weight-lever 4, brings the crank back to its starting-point, and hence withdraws the piston S² from the nozzle end of the cylinder, giving room for new material to be inserted, so that the operation may be repeated. When the piston travels to the back end of the cylinder, it also carries with it all small and loose pieces of meat that may have become detached in forcing the meat into the nozzle part of the cylinder, thereby clearing the middle part. The loose and detached pieces of meat back of the piston are thus forced into the openings between the arms W W' W², holding the bearing or sleeve V in the back end of the cylinder A, from where the pieces may fall into a box or barrel placed underneath the table. It is evident from the above description and specification that the machine may be made either single or double, the double one being preferred on account of saving of room and application of power. Furthermore, I desire it to be understood that I do not intend to limit myself to minor features or details of construction, as equivalents may be substituted therefor without departing from the spirit of my invention; nor do I intend to limit the application of my machine to the stuffing of boneless ham, as it is obvious that it may be used in stuffing material of similar nature.

What I regard as new, and desire to secure by Letters Patent, is—

1. In combination with a cylinder having an opening A', hopper X, sleeve V, nozzle Y, arms W W' W², a reciprocating plunger S², plunger-rod S, and crank G, upon which hub is fitted, a weight-lever 4, supplied with weight 5, insuring a positive return motion and stoppage at the required position, substantially as described, and for the purpose set forth.

2. In combination with a cylinder A, having an opening A', fitted with a hopper X, conical nozzle Y, sleeve V, arms W W' W², reciprocating plunger S², plunger-rod S, connecting-rod R, crank G, weight-lever 4, weight 5, shaft F, operating-lever K, clutch L, driving-pulley J, fitted with toothed hub, and journals 7 and 8, substantially as described, and for the purpose set forth.

3. In combination with double meat-stuffing machines having two cylinders A A², reciprocating plungers S³ S², cranks G G', weight-lever 4 4', weight 5 5', operating-levers K K', clutches I I', a driving-pulley J, supplied with journals resting in bearings E E', and toothed sides of hub, the hub being bored for receiving of shafts F F', substantially as described, and for the purpose set forth.

In testimony whereof I affix my signature in presence of two witnesses.

GEORGE NATHANIEL DE LORIEA.

Witnesses:
EDW. BARRATH,
FRANK J. LEONARD.